Sept. 20, 1971  R. L. MAISON ET AL  3,605,411
THRUST REVERSING APPARATUS
Filed July 1, 1970  2 Sheets-Sheet 1
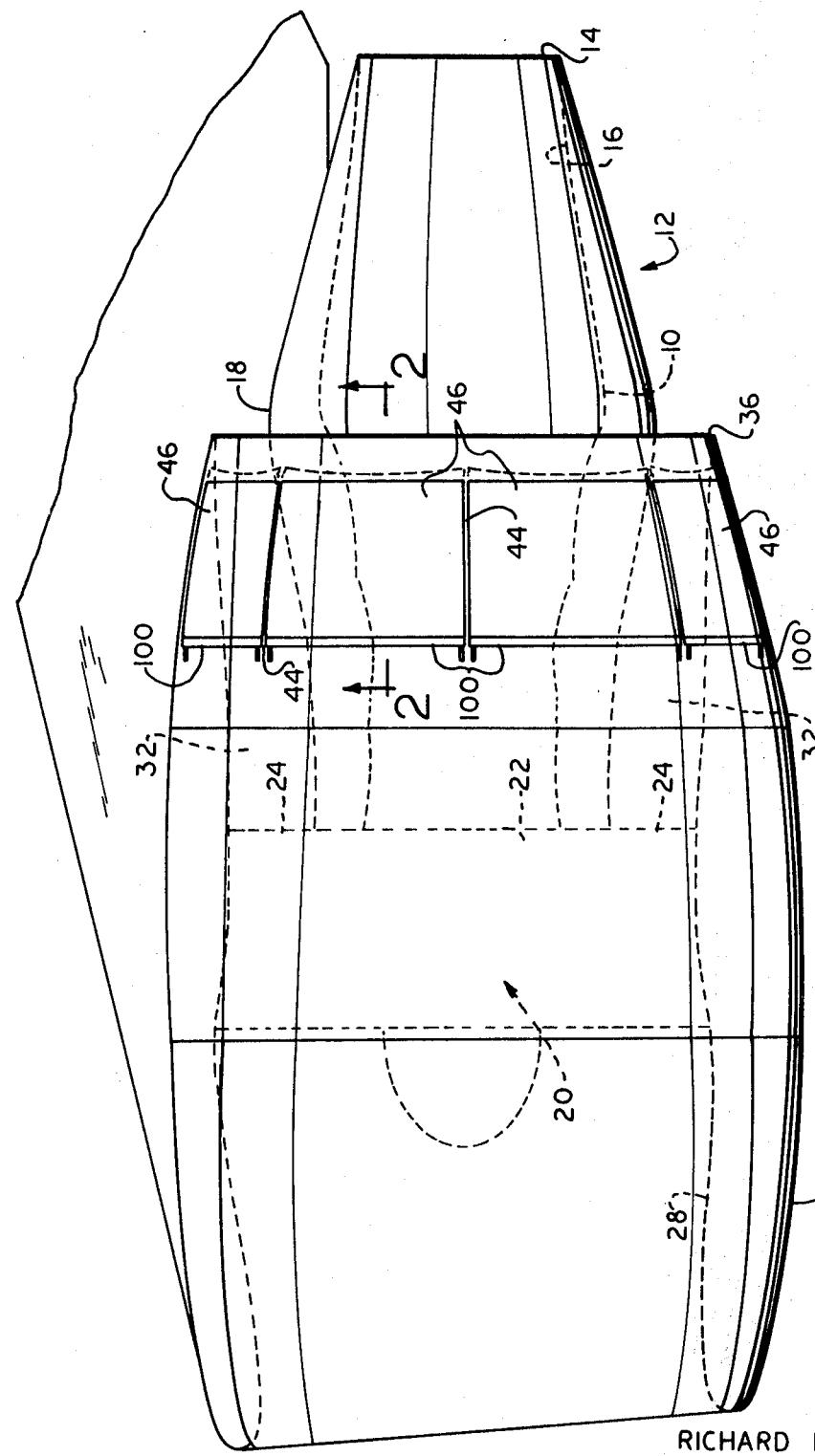
INVENTOR.
RICHARD L. MAISON
GEORGE E. MEDAWAR
BY George E. Pearson
ATTORNEY

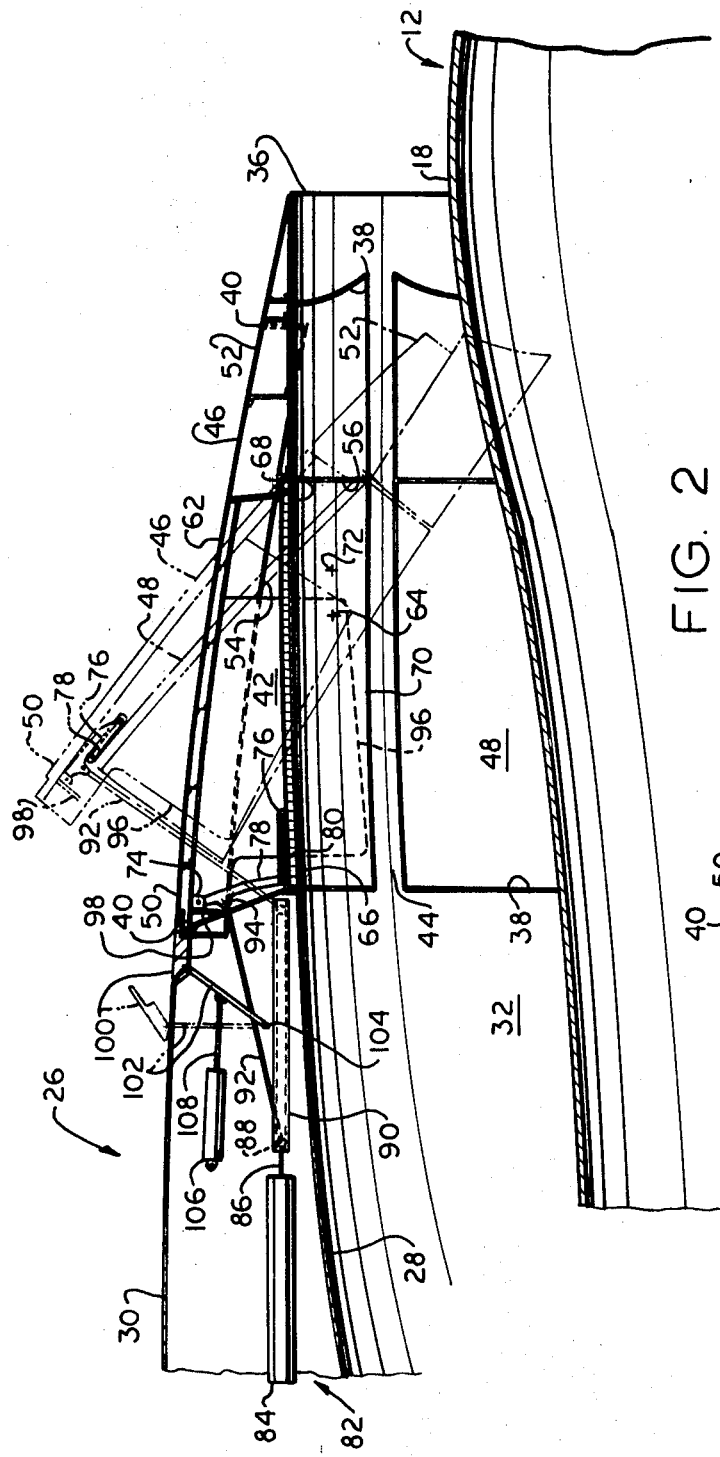
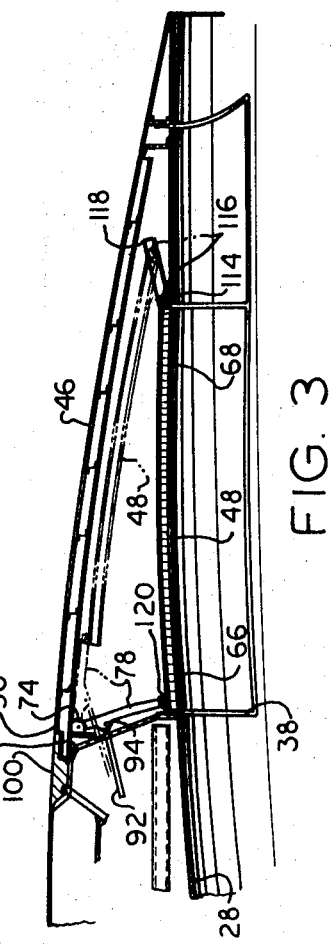

United States Patent Office 3,605,411
Patented Sept. 20, 1971

3,605,411
THRUST REVERSING APPARATUS
Richard L. Maison and George E. Medawar, San Diego, Calif., assignors to Rohr Corporation, Chula Vista, Calif.
Filed July 1, 1970, Ser. No. 51,587
Int. Cl. F02k 3/02
U.S. Cl. 60—226                     15 Claims

ABSTRACT OF THE DISCLOSURE

Front fan jet engine has cowl surrounding engine and terminating in jet exhaust nozzle. Elongate streamlined shroud with inner and outer walls surrounds cowl and is spaced radially therefrom to define annular fan air duct between cowl and shroud. Reverser includes outflow passage means comprising circumferentially arranged sets of openings in inner and outer walls of aft portion of shroud. A set of control doors is provided in each set of openings. Each door set includes an inner and an outer door swingable from stowed position closing openings in inner and outer shroud wall and conforming to shroud walls, to deployed, open position diverging forward from longitudinal axis of shroud with forward ends extending into free stream air, and aft ends of outer doors in blocking contact with engine cowl and each other, thereby blocking rearward flow of fan air and redirecting it outward and forward through passage means to produce reverse thrust. Forward ends of doors of each set approach each other during deployment to provide thinner overall leading edge and increase effective angle of divergence. Spoiler across leading edge of outer door opening swings open to prevent reingestion of reverser gases.

BACKGROUND OF THE INVENTION

This invention lies in the field of aircraft fan jet engines in which a nacelle or shroud surrounds the engine and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine. Airplanes which are equipped with jet type engines have high landing speeds which place a heavy burden on the wheel brakes. To reduce this burden, most such airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the jet nozzle and diverging forwardly. Another type uses openings in the side wall of the nozzle or a surrounding shroud together with blocker doors which swing toward the engine axis to block rearward flow and extend outward to direct the diverted flow laterally and forwardly. Still another type utilizes cascade sets in the side walls of the jet or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity, with relatively few machined parts, thus reducing initial cost as well as maintenance expense. Generally stated, the apparatus includes an elongate shroud which surrounds the fan and engine and provides an annular duct for the rearward flow of fan air. Peripherally arranged outflow passage means is provided in the aft portion of the shroud and extends through the inner and outer walls of the shroud. The passage means may comprise several discrete passages, preferably about six, or a single continuous passage with spaced axially extending support structures connecting the aftmost section of the shroud to the main body.

In either type of passage means there are a plurality of peripherally adjacent closure sets of control doors. Each set includes an outer blocker door and an inner or fold-in door, the two doors defining portions of the inner and outer contours of the shroud and closing portions of the inner and outer ends of the passage means when in stowed position. The doors are swingable in unison to deployed position in which they diverge forwardly with the forward ends extending into the free air stream and the aft end of at least one door in contact with the engine cowl. The combined doors join to block rearward flow of the propulsion air stream and redirect it laterally and forwardly through the passage means to produce reverse thrust.

Since the two doors of a set form parts of the inner and outer wall of the shroud in stowed position and the walls are spaced well apart radially and converging to a thin trailing edge, the combined door is rather thick, particularly at the forward end, and does not present a desirable form for deployment into the air stream. Hence the inner or fold-in door is made movable both with and with respect to the blocker door so that when they are fully deployed the forward end of the inner door is adjacent to the forward end of the blocker door, and the combined door is much thinner while the extreme forward end has only the thickness of the blocker door. In addition the inner door swings farther angularly than the blocker door, thus increasing the effective angle of divergence. In the presently preferred form, the two doors are independently pivotally mounted on transverse axes spaced forwardly of their aft ends, and linkage between the forward ends of the doors controlled by an actuator moves the doors in unison and also moves the inner door with respect to the blocker door. In one variation the inner door is pivotally connected at its aft end to the blocker door, and in another variation it is connected by a slide track to the blocker door, similar linkage being used for actuation.

BRIEF DESCRIPTION OF THE DRAWINGS

Various other advantages and features of novelty will become apparent as the description proceeds in conjunction with the accompanying drawings, in which:

FIG. 1 is a schematic side elevational view of an engine installation;

FIG. 2 is an enlarged, fragmentary, schematic sectional view showing aft portions of the shroud and cowl with one door set and the operating mechanism therefor, the door set being shown stowed in solid lines and deployed in dash-two-dot lines; and FIG. 3 is a schematic sectional view similar to the upper right hand portion of FIG. 2, illustrating a modification.

DESCRIPTION OF PREFERRED EMBODIMENTS

An illustrative embodiment of this invention is schematically illustrated in FIGS. 1 and 2, wherein an aircraft fan jet engine 10 is encased within a cowl 12 which terminates rearwardly in a nozzle or tail pipe 16 having exit 14. The diameter of the cowl 12 increases to a maximum in the zone 18. At its forward end the engine has an axial flow compressor or fan 20, the radially inner portion 22 of which propels combustion air into cowl 12, and the radially outer portion 24 of which propels fan air rearward outside of the cowl to produce jet thrust. Surrounding the fan and engine and spaced radially therefrom to provide a fan air duct 32 therebetween, is an elongate, streamlined, generally annular shroud 26 having radially spaced inner and outer walls 28 and 30. While a forward fan type engine is shown, the invention is applicable to an aft fan type.

The inner and outer shroud walls converge aft and terminate in a thin trailing edge 36 defining an air jet exit nozzle located substantially at the zone 18. A short distance ahead of the trailing edge 36, a plurailty of sets of passage openings 38 and 40, preferably eight sets, are formed through the inner and outer shroud walls, respectively, to produce the outflow passage means 42 for flow of exiting fan air during reverse thrust operation. Each set of such passage openings is separated from adjacent sets thereof by axially extending support structures 44, which unite the shroud portion aft of the passage means with the fore section or main body of the shroud. The passage means 42 may be located alternatively at the extreme aft end of the shroud or at other desired locus along its length aft of the fan.

In the presently preferred form shown in FIGS. 1 and 2, thrust reversing mechanism includes a plurality of sets of control doors circumferentially arranged so that in stowed position they combine to close the passage means 42. Each door set comprises an outer or blocker door 46 and an inner or fold-in door 48, the latter being illustrated as of honeycomb core panel. In stowed position each outer door 46 fits into and closes one of the passage openings 40 in the outer shroud wall 30 and conforms to the outer shroud wall. Each of the passage openings in the outer shroud wall has forward, aft and side margins 50, 52 and 54, respectively.

The forward portion of each outer door 46 comprises a thin wall portion 62, while the aft portion of each door 46 beyond the aft end of its associated inner door 48 is thickened to extend through the entire thickness of the shroud and forms a closure for the aft portion of its respective opening 38 in the inner wall 28.

Each outer door 46 is pivotally mounted in the side walls of support structures 44 to swing about a transverse axis 64 located between its forward and aft ends. When the doors 46 swing to their deployed position as shown in dash-two-dot lines in FIG. 2, their aft ends 52 swing inward into blocking contact with the engine cowl 12, their sides cooperate to block the fan air duct 32, and their forward ends 50 swing out into the free air stream so that the doors diverge forwardly from the longitudinal axis of the shroud. Thus, the combination of all of the blocker doors around the periphery will join to block rearward flow of the fan air stream and redirect it laterally outward and forward to produce the desired reverse thrust effect.

The purpose of the inner or fold-in door 48 is to complete the smooth contour of the shroud inner wall 28 to facilitate air flow during normal flight operation and to complete the closure of opening 38 in the shroud inner wall, thus completely blocking flow through passage 42. Its forward end 66 conforms to the forward margin of opening 38 and its aft end 68 conforms to the forward margin 56 of the thickened aft end of door 46, while its side edges 70 conform to the side margins of opening 38. Door 48 is pivotally mounted at 72, a predetermined distance aft of pivot 64, in the side walls of support structures 44 about a transverse axis intermediate between its forward and aft ends. If doors 46 and 48 were one single door with a substantial taper as shown, it would have a very thick forward end which it is undesirable to project into the free air stream and its effective angle of divergence for guiding the outflow would be substantially less for any given angle of depolyment. With the two piece construction of the invention, the aft end of doors 48 retains its position relative to door 46 but its forward end 66 swings through a greater angle into adjacency with the forward end 50 of door 46. Therefore, in the deployed position, the combined door is much thinner and has a very thin leading edge.

The means for actuating the two doors between stowed and deployed position includes a pivotal mounting 74 at the forward end 50 of doors 46, a guide track 76 of predetermined length at the forward end 66 of door 48, and a link 78 connected at a first end to the pivotal mounting and having a guide follower 80, preferably a roller, at its second end engaging in the guide track. Actuating means 82 includes a servo cylinder 84 mounted in the shroud and having a piston rod 86 carrying a guide follower roller 88 at its free end which travels in guide track 90. A force transmitting member 92 in the form of a second link is pivotally connected at a first end to roller 88 and at its second end to link 78 at an intermediate point 94. For deployment, roller 88 is moved rearward to the aft end of track 90 and link 92 causes link 78 to swing about its pivotal mounting 74. Roller 80 travels the length of track 76 and swings door 48 to the broken line position with its forward end 66 adjacent to forward end 50 of door 46. The movement of link 92 also forces the combined door to the fully deployed position with the aft end 52 of door 46 in contact with cowl 12.

Each closure set may be stowed and deployed by a single actuator, or guide follower rollers 88 may be connected to a thrust ring operated by two or more actuators. Snychronized action may be accomplished by the use of sets of bevel gears at the door hinge lines.

In order to prevent spillage and increase the reverse thrust effect, a fence 96 may be provided at each side of each blocker door. Also, to increase the forward flow component, an end plate 98 may be mounted at the forward end 50 of each blocker door.

In the configuration shown, the effective angle of divergence of the doors is about 45 degrees. This angle may be increased to 60 or 70 degrees by changes in the geometry. In the case of the configuration shown there is a possibility of reingestion under some circumstances. To forestall this possibility, a deflector plate 100 may be provided ahead of some or all of the blocker doors. In stowed position each plate, which has a width approximately equal to that of the blocker door, lies flush with the shroud outer wall and may overlie the forward edge 50 of outer door 46. The deflector plate 100 is fixedly mounted on strut 102, which is pivotally mounted at 104 within the shroud wall. Servo cylinder 106 and piston rod 108 act to swing the strut and plate to deployed position as shown in broken lines in FIG. 2, where the plate diverges rearward from the shroud axis. In this deployed position the plate 100 acts to deflect the boundary layer, and produce eddies which prevent forward flow adjacent to the shroud and possible reingestion. In some cases, as when the ground effect is substantial, it may be necessary to provide deflector plates only on the lower portion of the shroud. Rearwardly diverging jet streams may also be used in the same way. Instead of using separate actuators, the deflector plates may be connected to the door actuators by suitable linkages.

Instead of having separate pivotal mounting, each door 48 may be carried by a door 46 as illustrated in FIG. 3, where the aft end of door 48 is provided with a bracket 114 having a roller 116 adapted to travel in guide track 118. In this case link 78 is directly pivotally connected to a mounting 120 at the forward end 66 of door 48, and when link 78 swings aft it causes aft bodily movement of door 48 to move it into substantial parallelism with door 46. In this modification the wedge shape of the deployed doors is not attained.

Having thus described the invention, what is claimed as new and useful and desired to be secured by U.S. Letters Patent is:

1. Thrust reversing apparatus for use in combination with a jet engine enclosed in a core cowl and having a fan driven by the engine to produce a propulsion air stream, comprising: a streamlined shroud surrounding the engine and fan and having inner and outer walls spaced from each other throughout at least the major portion of the length of the shroud; the inner wall being radially spaced from the engine cowl to define therewith a generally annular duct for rearward flow of the propulsion air stream delivered by the fan; peripherally arranged outflow passage means downstream of the fan extending through the inner and outer walls of the shroud for lateral flow of the jet air stream during reverse thrust operation; and a plurality of sets of control doors arranged in lateral adjacency around the periphery of the shroud and in said passage means; each set including a blocker door and a fold-in door; the blocker door of each set being pivotally mounted at a locus intermediate between its forward and aft ends on a transverse axis, and in stowed position forming a portion of the contour of the shroud outer wall and a portion of the contour of the shroud inner wall and closing corresponding portions of the outer and inner ends of the passage means; each blocker door being swingable to deployed position diverging forward from the longitudinal axis of the shroud with its forward end extending into the free air stream and its aft end in contact with the engine cowl; the deployed blocker doors in combination joining to block rearward flow of fan air through the exit end of the shroud and redirect it laterally through the passage means; the fold-in door of each set being movably mounted for swinging with and with respect to its associated blocker door, and in stowed position forming a portion of the contour of the shroud inner wall and closing a corresponding portion of the inner end of the passage means; each fold-in door being swingable to deployed position diverging forward from the longitudinal axis of the shroud with its forward end adjacent to the forward end of its respective blocker door to decrease the effective thickness of the combined doors.

2. Apparatus as claimed in claim 1; the fold-in door of each set being pivotally mounted on a transverse axis at a locus intermediate between its forward and aft ends and being swingable through a greater angle of deployment than the blocker door.

3. Apparatus as claimed in claim 2; the transverse pivotal axis of the fold-in door being aft of the transverse pivotal axis of the blocker door.

4. Apparatus as claimed in claim 1; the fold-in door being movably mounted to the blocker door.

5. Apparatus as claimed in claim 1; the fold-in door being pivotally mounted adjacent its aft end to the blocker door.

6. Apparatus as claimed in claim 1; and a fence secured to each side marginal edge of each blocker door to confine the flow of the diverted exhaust stream to the desired direction.

7. Apparatus as claimed in claim 1; and an end plate secured adjacent to the forward end of each blocker door to increase the forward flow component of the diverted exhaust stream.

8. Apparatus as claimed in claim 1; and deflector plates located forward of at least some of the blocker doors; each deflector plate in stowed position lying substantially flush with the outer wall of the shroud and being movable to a deployed position diverging aft from the longitudinal axis of the shroud to minimize reingestion effects.

9. Apparatus as claimed in claim 8; the deflector plates being provided only on the lower side of the shroud.

10. Apparatus as claimed in claim 1; the fold-in door of each set being pivotally mounted on a transverse axis; linkage means connecting the forward ends of the associated doors; axially movable actuator means carried by the shroud; and a force transmitting member connected between the actuator means and the linkage means.

11. Apparatus as claimed in claim 10; the linkage means including a pivotal mounting at the forward end of the blocker door; a guide track of predetermined length at the forward end of the fold-in door; a fixed length link pivotally connected at a first end to the pivotal mounting; and a guide follower at the second end of the link slidably engaging in the guide track.

12. Thrust reversing apparatus for use in combination with a jet engine enclosed in a core cowl and having a fan driven by the engine to produce a propulsion air stream, comprising: a streamlined shroud surrounding the engine and fan and having inner and outer walls spaced from each other throughout at least the major portion of the length of the shroud, the walls of the aft portion converging to a thin trailing edge; the inner wall of the shroud being radially spaced from the engine cowl to define therewith a generally annular duct for rearward flow of the propulsion air stream delivered by the fan; peripherally arranged outflow passage means in the aft portion of the shroud extending through the inner and outer walls for lateral flow of the jet air stream during reverse thrust operation; and a plurality of closure sets arranged in lateral adjacency around the periphery of the shroud and in said passage means; each set including an outer door and an inner door defining portions of the outer and inner contours of the shroud and closing portions of the outer and inner ends of the passage means in stowed position; the forward end of each set being substantially thicker radially than the aft end; the sets being swingable in unison about transverse pivotal axes to deployed position diverging forwardly from the longitudinal axis of the shroud with their forward ends extending into the free air stream and their aft ends in contact with the engine cowl; the deployed sets in combination joining to block rearward flow of fan air through the exit end of the shroud and redirect it laterally through the passage means; the inner and outer doors of each set being relatively movable during deployment to bring their forward ends into adjacency to define a relatively thin blocker door with a thin leading edge.

13. Apparatus as claimed in claim 12; the inner and outer door of each closure set being independently pivotally mounted on a transverse axis at a locus intermediate between its forward and aft ends.

14. Apparatus as claimed in claim 12; the outer door of each closure set being pivotally mounted on a transverse axis at a locus intermediate between its forward and aft ends; and the inner door being movably mounted to the outer door.

15. Apparatus as claimed in claim 12; the outer door of each closure set being pivotally mounted on a transverse axis at a locus intermediate between its forward and aft ends; and the inner door being pivotally mounted adjacent its aft end to the outer door.

References Cited

UNITED STATES PATENTS

| | | | |
|---|---|---|---|
| 3,279,182 | 10/1966 | Helmintoller | 60—226A |
| 3,280,561 | 10/1966 | Kutney | 60—226A |
| 3,386,247 | 6/1968 | Gross | 60—226A |
| 3,483,702 | 12/1969 | Ward | 60—226A |

CLARENCE R. GORDON, Primary Examiner

U.S. Cl. X.R.

60—232; 239—265.19